United States Patent [19]

Kubota

[11] 3,740,458

[45] June 19, 1973

[54] IMAGE PICKUP TUBE

[75] Inventor: Yasuharu Kubota, Kanagawa, Japan

[73] Assignee: Sony Corporation, Tokyo, Japan

[22] Filed: Aug. 31, 1971

[21] Appl. No.: 176,553

Related U.S. Application Data

[63] Continuation-in-part of Ser. No. 72,593, Sept. 16, 1970.

[30] Foreign Application Priority Data

Sept. 3, 1970 Japan .............................. 45/87715

[52] U.S. Cl. .......................... 178/5.4 ST, 178/5.4 F

[51] Int. Cl. ............................................ H04n 9/06

[58] Field of Search .................. 178/5.4 ST, 5.4 G, 178/5.4 H

[56] References Cited

UNITED STATES PATENTS 2,843,659 7/1958 James ............................ 178/5.4 ST

*Primary Examiner*—Richard Murray

*Attorney*—Lewis H. Eslinger, Alvin Sinderband et al.

[57] ABSTRACT

An image pickup tube for a color television camera has a photoconductive layer for the conversion of images projected thereon into an electrical output and onto which a color separated image of an object to be reproduced is projected through a color filter which is part of the tube or separate therefrom, indexing electrodes disposed in close proximity to the photoconductive layer to electrically produce an index image on such layer in response to the application of different voltages to the indexing electrodes so that the electrical output is a composite signal containing a color video signal corresponding to the color separated image and an index signal corresponding to the index image and by which individual color component signals may be separated from the color video signal, and photoelectric transducing means, such as, photoconductive cells, photodiodes, photoswitches, phototransistors or photovoltaic cells, included in the image pickup tube and forming parts of circuits by which voltage differences are applied to the indexing electrodes for establishing the index image.

9 Claims, 29 Drawing Figures

INVENTOR.
YASUHARU KUBOTA
BY Lewis H. Eslinger
ATTORNEY

INVENTOR.
YASUHARU KUBOTA
BY Louis H. Epliager
ATTORNEY

INVENTOR
YASUHARU KUBOTA
BY Louis H. Eslinger
ATTORNEY

INVENTOR
YASUHARU KUBOTA

BY [signature]
ATTORNEY

INVENTOR
YASUHARU KUBOTA
BY
Lewis H. Eslinger
ATTORNEY

INVENTOR
YASUHARU KUBOTA
BY Lewis H. Eslinger
ATTORNEY

FIG. 13.
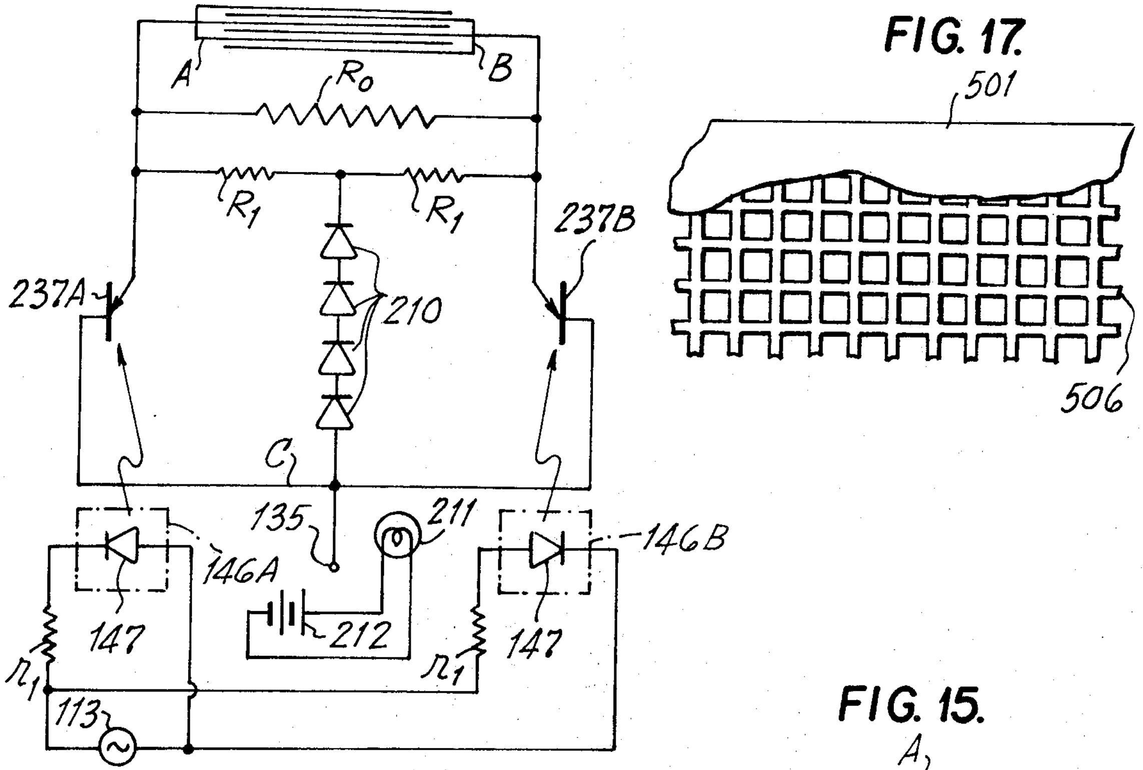
FIG. 13, FIG. 17.
FIG. 15.
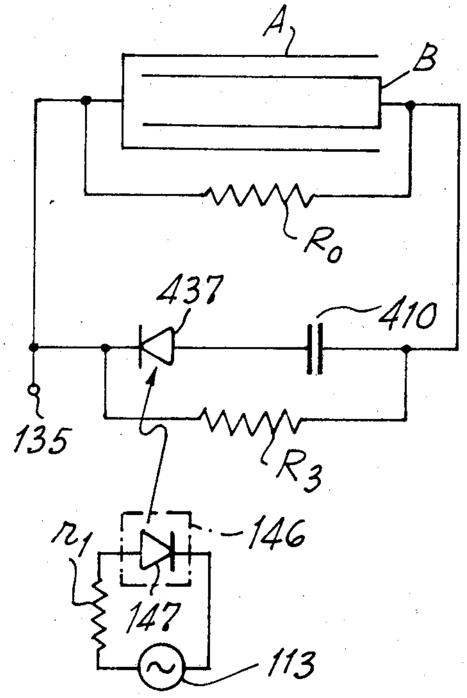
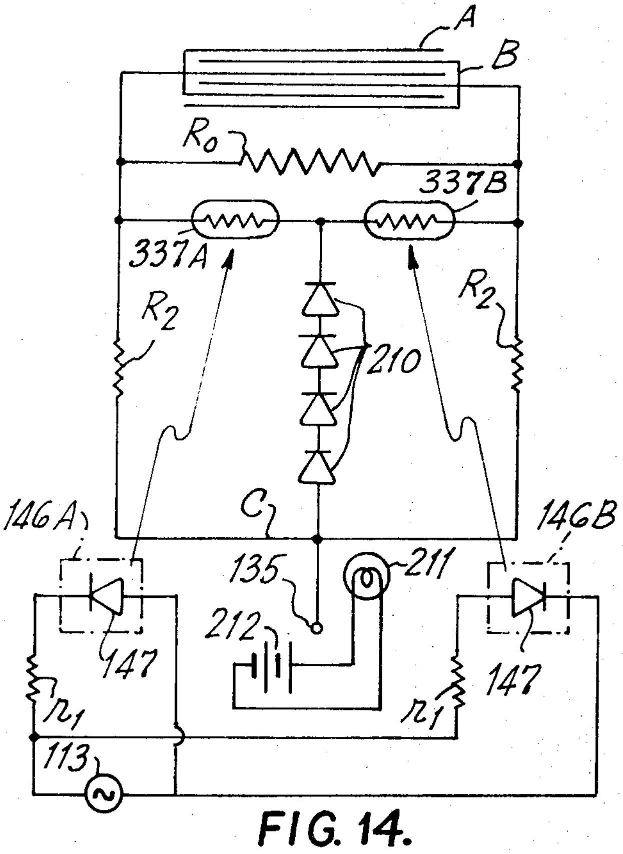
FIG. 14.
INVENTOR
YASUHARU KUBOTA
BY
*[signature]*
ATTORNEY

INVENTOR
YASUHARU KUBOTA
BY
ATTORNEY

IMAGE PICKUP TUBE

This invention relates generally to a device for producing a color video signal by the employment of a single image pickup tube, and more paticularly is directed to an image pickup tube for a television camera capable of producing color signals which are free from crosstalk. This application is a continuation-in-part of my copending U.S. Pat. application Ser. No. 72,593, filed Sept. 16, 1970.

A pickup tube of the type having a target with a multiplicity of color filters and signal plates extending transversely of the direction of line scan has been disclosed in U.S. Pat. No. 2,446,249. In this type of pickup tube the signal plates corresponding to the color filters are connected to bus bars and the respective primary color video signals are derived from three signal output terminals connected to the bus bars. However, this pickup tube is defective in that each primary color video signal is mixed with other primary color video signals due to the electrostatic capacity coupling present between the respective signal electrodes. This results in crosstalk which lowers the color purity of the color video signal.

There has also been proposed a system, such as that disclosed in U.S. Pat. No. 3,502,799, in which a plurality of index signal images and striped color component images are optically formed on the target of a vidicon tube to produce a composite color video signal containing an index signal. With this system, however, the ratio between the color component image area and the effective scanning area of the vidicon is decreased by an amount corresponding to the area occupied by the index signal images. This results in lower resolution. Further, this prior art system necessitates a complicated and expensive device for optically forming the index signal images on the target.

It is a general object of this invention to provide a color television camera employing a single image pickup tube and which is free of the above disadvantages of the prior art.

Another object is to provide a color television camera with a single image pickup tube having a photoconductive layer on which a color separated image of an object to be reproduced is projected, and indexing electrodes disposed in close proximity to the photoconductive layer electrically produce an index image on that layer in response to the application of different voltages to the indexing electrodes, so that the electrical output from the photoconductive layer is a composite signal containing a color video signal corresponding to the color separated image and an index signal corresponding to the index image and by which individual color component signals may be separated from the color video signal.

A specific object of the invention is to provide an image pickup tube for a color television camera, as aforesaid, which has an advantageous arrangement for applying the different voltages to the indexing electrodes for forming the index signal on the photoconductive layer.

A further object is to provide an image pickup tube, as aforesaid, in which the manufacture and sealing of the tube are facilitated, particularly with respect to the means employed for applying the required voltages to the indexing electrodes of the tube.

In accordance with this invention, photoelectric transducing means, such as, photoconductive cells, photodiodes, photoswitches, phototransistors or photovoltaic cells, are included in the image pickup tube and made part of a circuit for applying different voltages to the indexing electrodes, and such photoelectric transducing means are selectively activated, from outside the tube by suitable devices emitting radiant energy, for example, by luminescent diodes emitting invisible rays, such as infrared rays, to which the photoconductive layer is insensitive.

The above, and other objects, features and advantages of this invention, will be apparent in the following detailed description of illustrative embodiments which is to be read in connection with the accompanying drawings, wherein.

Figure 1:
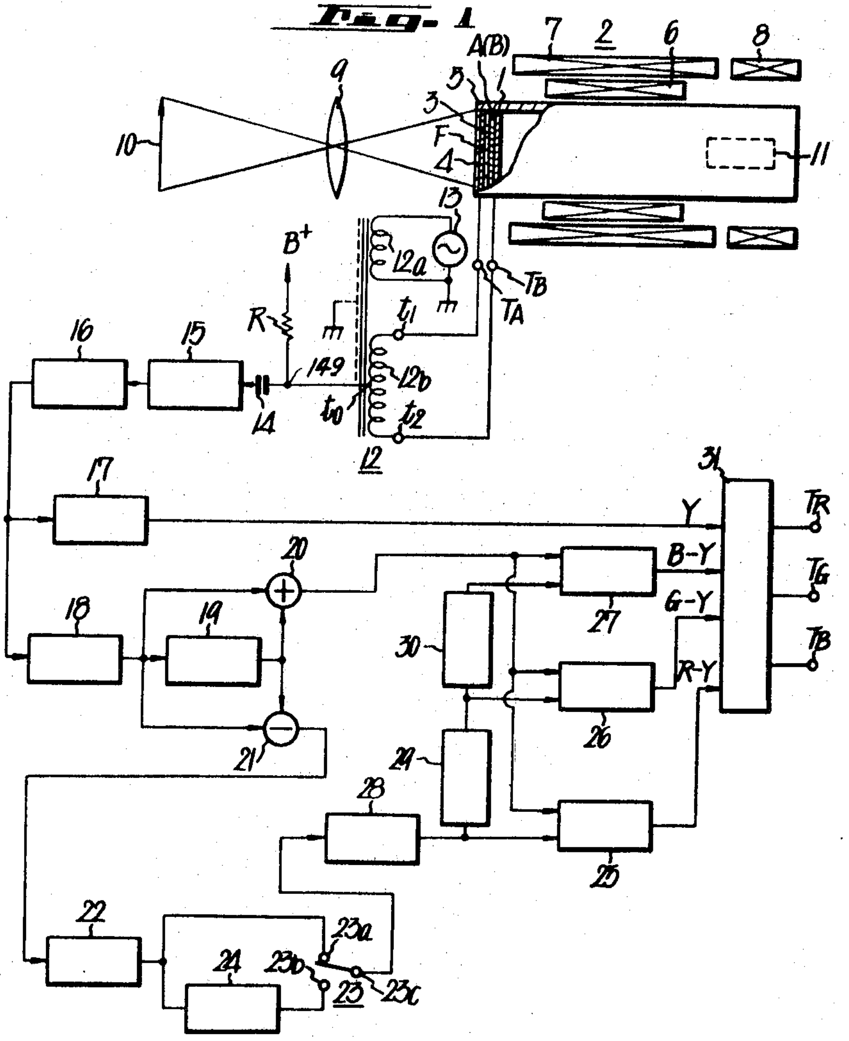
FIG. 1 is a system diagram illustrating a color television camera of a type in which an image pickup tube in accordance with the present invention may be employed.
Figure 2:
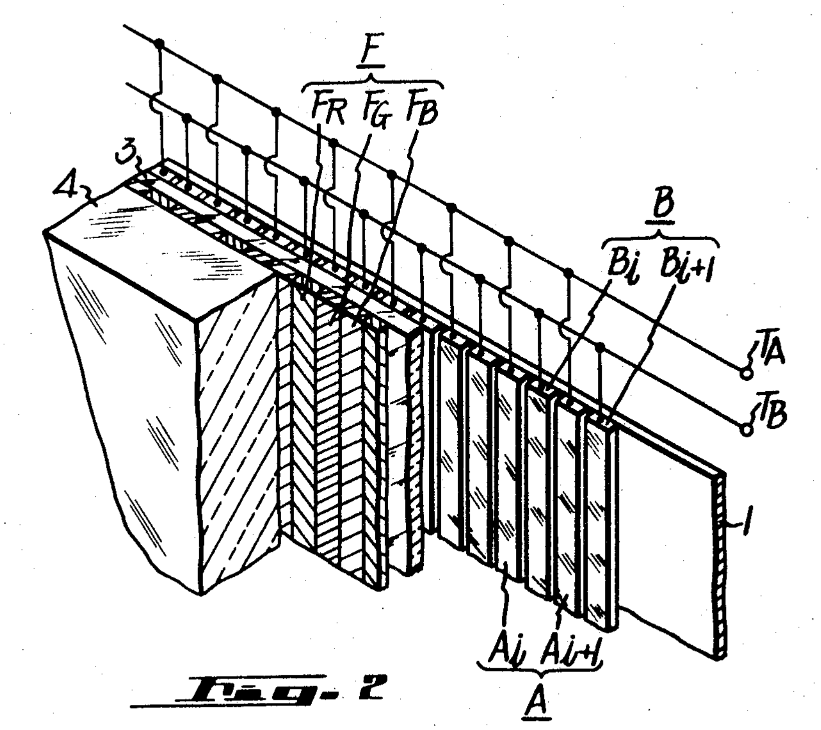
FIG. 2 is a perspective view, partly in cross-section, schematically showing the principal parts of a pickup tube employed in the color television camera illustrated in FIG. 1.
Figure 3:
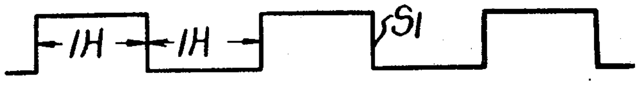
Figure 5:
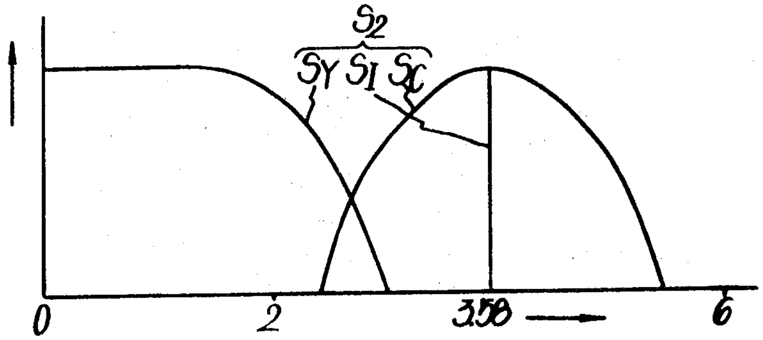
Figure 6:
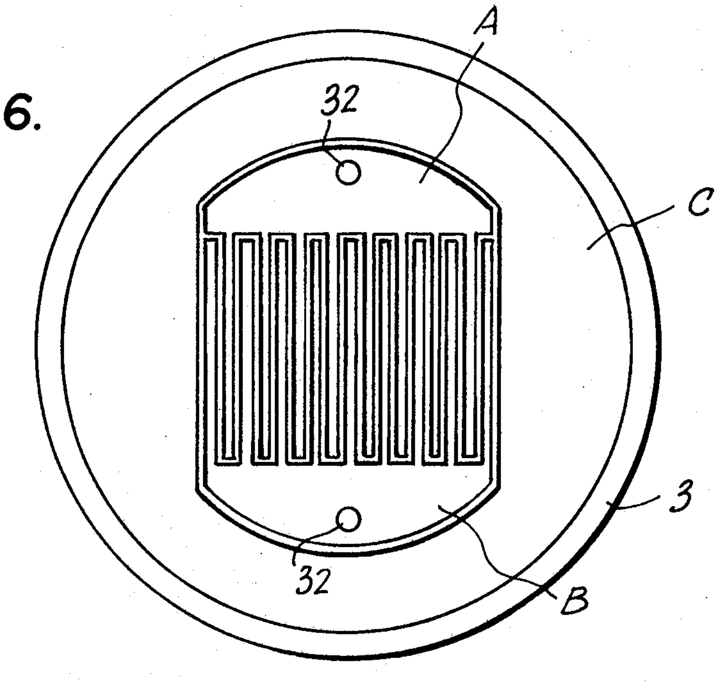
Figure 7:
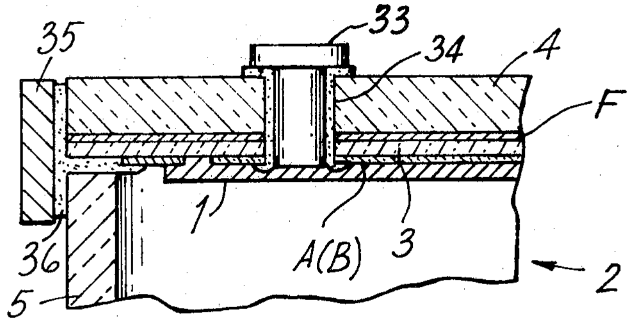
Figure 10:
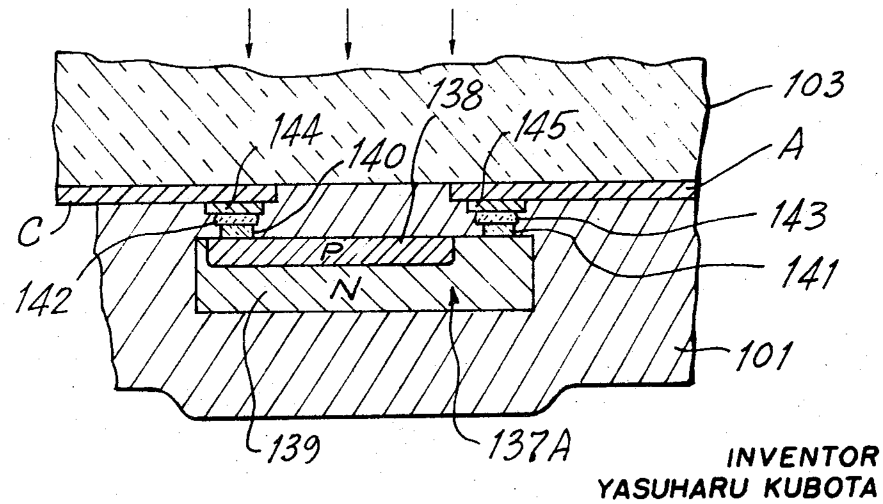
Figures 8, 9, 11:
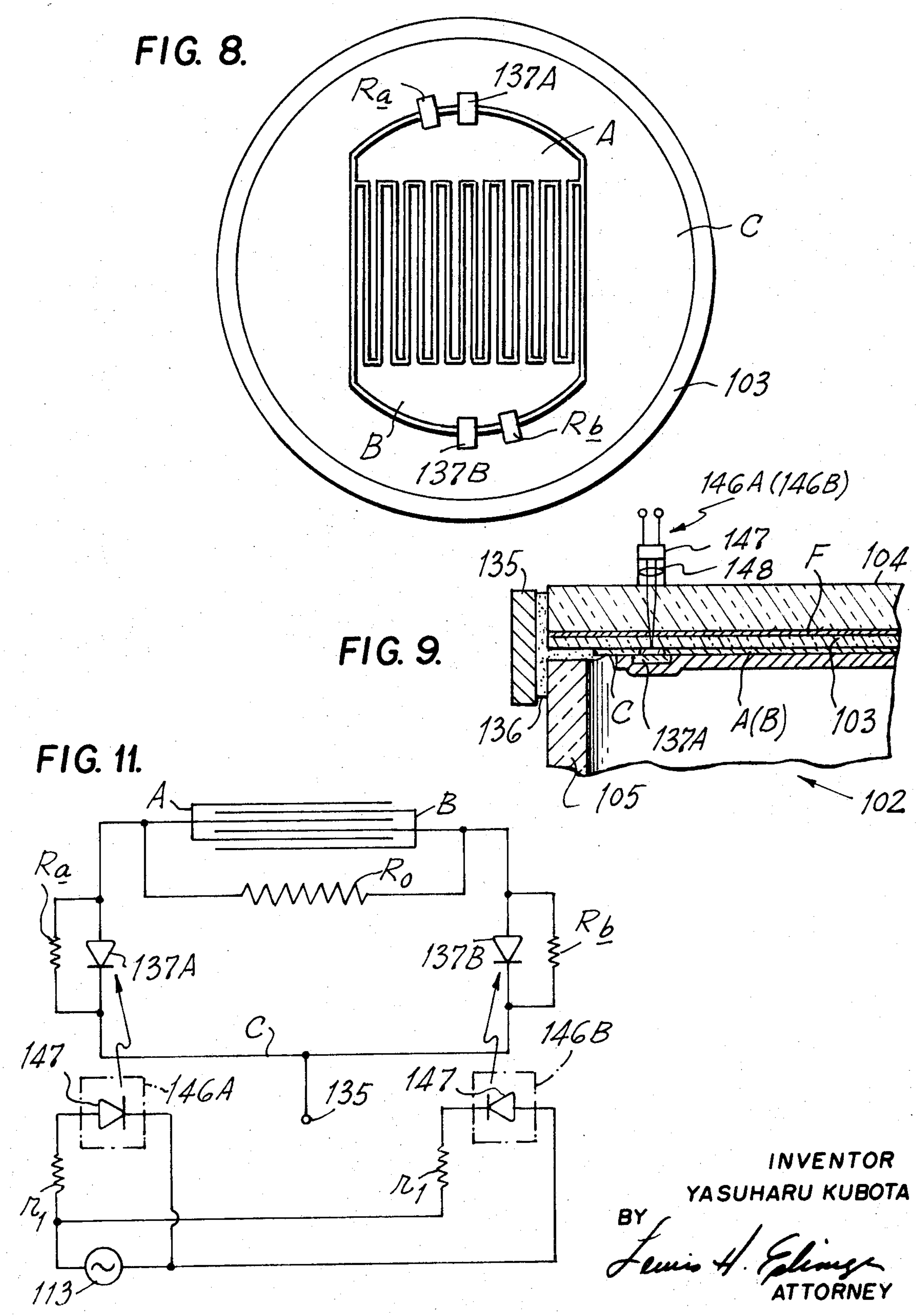
Figure 16:
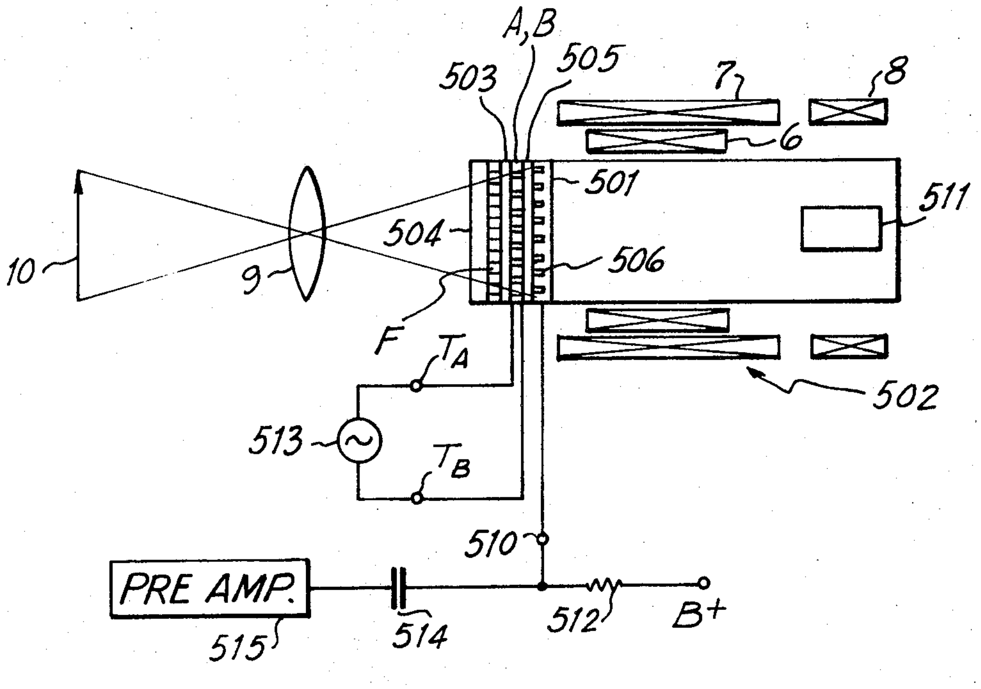
Figures 18, 20:
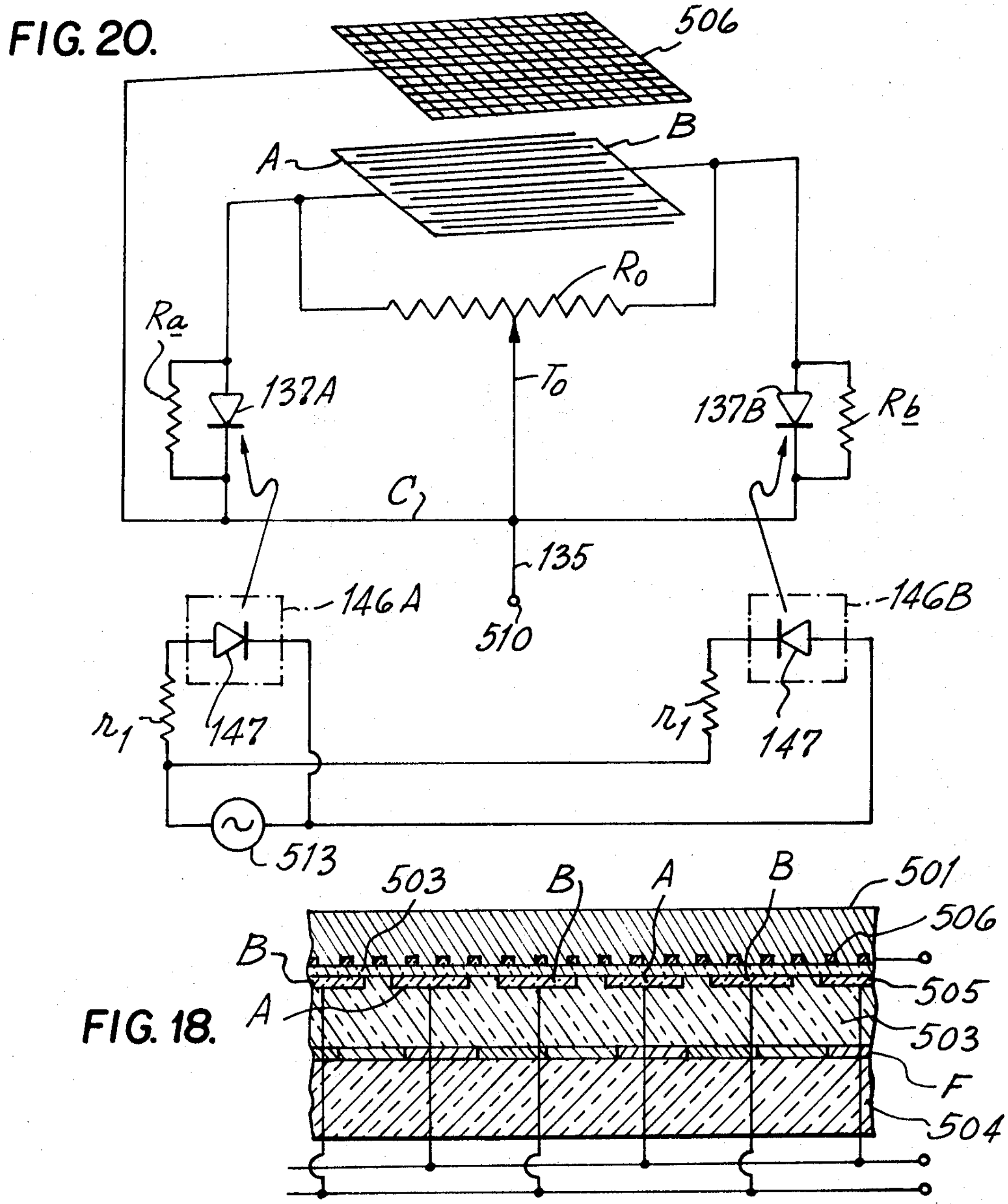
Figures 19A, 19B:
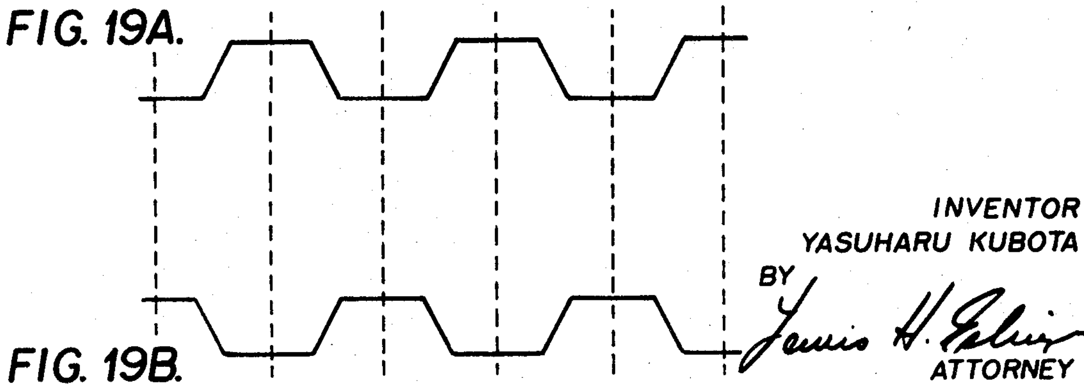

FIGS. 3 and 4A–4F and 4A', 4B', 4C' are waveform diagrams, for explaining the operation of the camera shown on FIGS. 1 and 2;

FIG. 5 is a graph showing one example of a frequency spectrum for a color video signal produced by the color television camera of FIGS. 1 and 2;

FIG. 6 is a plan view showing the arrangement of the indexing electrodes in one image pickup tube that has been proposed for use in the camera of FIGS. 1 and 2;

FIG. 7 is an enlarged, fragmentary sectional view taken along the line 7—7 on FIG. 6, and showing the structure by which each of the indexing electrodes of the previously proposed image pickup tube is connected to the associated electric circuit;

FIGS. 8 and 9 are views similar to FIGS. 6 and 7, respectively, but showing an image pickup tube according to an embodiment of this invention;

FIG. 10 is a further enlarged sectional view showing details of one of the photovoltaic cells used as the photoelectric transducers in the embodiment of FIGS. 8 and 9;

FIG. 11 is a circuit diagram showing the electrical circuit equivalents of the arrangement illustrated in FIGS. 8–10;

FIGS. 12 through 15 are circuit diagrams similar to FIG. 11, but showing other respective embodiments of this invention;

FIG. 16 is a system diagram showing a portion of another type of color television camera in which an image pickup tube according to this invention may be employed;

FIG. 17 is an enlarged plan view, partly cut away, illustrating parts of a pickup tube used in the example illustrated in FIG. 16;

FIG. 18 is a cross-sectional view of a portion of the pickup tube depicted in FIG. 17;

FIGS. 19A and 19B are diagrams for explaining operation of the pickup tube shown in FIGS. 17 and 18; and FIG. 20 is a circuit diagram showing the electrical circuit equivalents of an image pickup tube according to this invention intended for use in a color television camera of the type shown on FIG. 16.

In order to provide a suitable background for explanation of this invention, a color television camera of a type in which an image pickup tube embodying the invention may be employed will be generally described with reference to schematic FIGS. 1 and 2.

In FIGS. 1 and 2, a pair of index electrodes A (composed of elements $A_1, A_2, \ldots A_i, \ldots A_n$) and B (composed of elements $B_1, B_2 \ldots B_i \ldots B_n$) are shown disposed adjacent the photoconductive layer 1 of a pickup tube 2. The photoconductive layer 1 is formed, for example, of materials such as antimony trisulfide, lead oxide and the like. The electrodes A and B are transparent conductive layers formed of tin oxide including antimony, and they are arranged with their elements alternated, for example, in an order which may be $A_1$, $B_1$, $A_2$, $B_2$, . . . $A_i$, $B_i$, . . . $A_n$, $B_n$. The electrodes A and B are shown respectively connected to terminals $T_A$ and $T_B$ for connection with external circuits. In this case, the electrodes A and B are disposed so that the longitudinal axes of their elongated elements may cross the horizontal scanning direction of an electron beam.

The electrodes A and B are disposed on one side of a glass plate 3, on the other side of which there is an optical filter F made up of red, green and blue color filter elements $F_R$, $F_G$ and $F_B$ arranged in a repeating cyclic order of $F_R$, $F_G$, $F_B$, $F_R$, $F_G$, $F_B$ . . . and disposed parallel to the length of the elements of electrodes A and B in such a manner that each triad of red, green and blue color filter elements $F_R$, $F_G$ and $F_B$ may be opposite to each pair of adjacent electrode elements $A_i$ and $B_i$. So long as the elements of electrodes A and B and of optical filter F are aligned with each other in their longitudinal directions, their relative arrangement is optional. The optical filter F is shown covered by a faceplate 4 mounted at one end of the tube envelope 5 so that the photoconductive layer 1, the electrodes A and B, the glass plate 3 and the optical filter F are enclosed in the tube envelope 5. About the image pickup tube 2 there are mounted a deflection coil 6, a focusing coil 7 and an alignment coil 8. Reference numeral 9 indicates an image lens, by means of which the image of an object 10 to be televised is focused onto the photoconductive layer 1 through the faceplate 4. Reference numeral 11 designates an electron gun for emitting the electron beam which is made to scan the layer 1 by the deflection coil 6.

A transformer 12 consists of a primary winding 12a and a secondary winding 12*b* having a mid tap $t_0$. The end terminals $t_1$ and $t_2$ of the secondary winding 12*b* are respectively connected to terminals $T_A$ and $T_B$ of the image pickup tube 2. The primary winding 12a is connected to a signal source 13 which produces an alternating signal $S_1$ (FIG. 3) that is synchronized with the line scanning period of the image pickup tube 2. This alternating signal $S_1$ has a rectangular waveform with a pulse width equal to a horizontal scannint period H of the electron beam, for example, a pulse width of 63.5 microseconds and a frequency which is one-half of the horizontal scanning frequency, namely, 15.75/2 KHz. The mid top $t_o$ of secondary winding 12*b* is connected to the input of a preamplifier 15 through a capacitor 14 and is supplied with a DC bias voltage of 10 to 50V from a power source B+ through a resistor R.

With such an arrangement, the electrodes A and B are alternately supplied with voltages higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, electron beam scanning of layer 1 results in a signal $S_I$ corresponding to the rectangular waveform illustrated in FIG. 4A being derived, in a scanning period $H_1$, at the mid top $t_o$ of the secondary winding 12*b*. When a DC bias voltage, for example, 30V, is supplied to the mid top $t_o$ of the secondary winding 12*b* and an alternating voltage of 0.5V is impressed between the terminals $T_A$ and $T_B$, the current flowing across the resistor R varies by 0.05 microamperes and can be used as an index signal. The frequency of this index signal $S_I$ is optionally determined with reference to the width and interval of the elements of electrodes A and B and one horizontal scanning period of the electron beam, and can for example be 3.58 MHz. When a color separated image of the object 10 is focused on the photoconductive layer 1 by means of lens 9 and filter F, signals corresponding to the light intensity of the filtered red, green and blue components are produced in overlapping relation with the index signal $S_I$ in response to beam scanning of layer 1 to produce a composite signal $S_2$ such as is illustrated in FIG. 4B, in which the reference characters R, G and B respectively designate portions of the composite signal $S_2$ corresponding to the red, green and blue color components. The composite signal $S_2$ is the sum of the luminance signal $S_Y$, the chrominance signal $S_C$ and the index signal $S_I$, namely $S_2=S_Y+S_C+S_I$. The frequency spectrum of the composite signal $S_2$, as illustrated in FIG 5, is determined by the width of the elements of electrodes A and B and of the optical filter F, and by the horizontal scanning period. That is, the composite signal $S_2$, in its entirety, is in a bandwidth of 6 MHz and the luminance and chrominance signals $S_Y$ and $S_C$ are respectively arranged in the lower and higher bands of that bandwidth. It is preferred to minimize overlapping of the luminance and chrominance signals $S_Y$ and $S_c$ and, if desired, it is possible to dispose a lenticular lens or the like in front of the image pickup tube 2. This optically lowers resolution and narrows the luminance signal band.

Figure 4A:
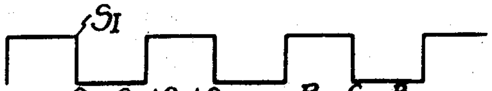
Figure 4B:
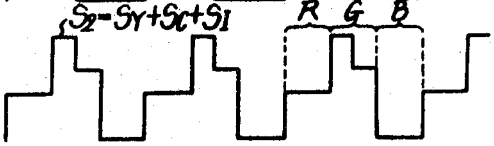
Figure 4C:
Figure 4A:
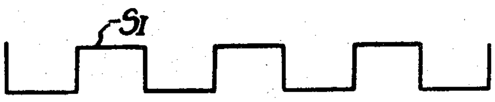
Figure 4B:
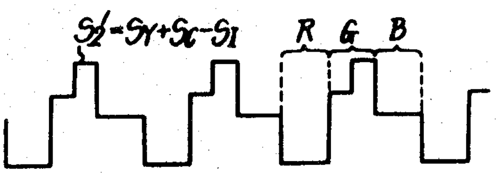
Figure 4C:

In the next horizontal scanning period $H_{i+1}$ the voltage (the alternating signal) applied to the electrodes A and B is reversed in phase, in which case an index signal $-S_I$ is produced, as depicted in FIG. 4A', which is opposite in phase to the index signal $S_I$ shown in FIG. 4A. Accordingly, a composite signal $S_2'$ is then supplied to the input side of preamplifier 15, as shown in FIG. 4B', namely $S2'=S_y+S_C-S_I$.

Such a composite signal $S_2$ (or $S_2'$) is supplied through the preamplifier 15 to the process amplifier 16 for waveform shaping and/or gamma correction. Thereafter, the signal is applied to a low-pass filter 17 and a bandpass filter 18. As a result, the luminance signal $S_Y$ and a signal $S_3=S_{CL}+S_{IL}$ (FIG. 4C), or a signal $S_3'=S_{CL}-S_{IL}$ (FIG. 4C') are respectively derived from the low-pass filter 17 and the bandpass filter 18. In the foregoing equations for $S_3$ and $S_3'$, $S_{CL}$ and $S_{IL}$ are low frequency components or fundamental components of the chrominance signal $S_L$ and the index signal $S_I$, respectively.

Since the repetitive frequencies of the index signals $S_I$ and the chrominance signal $S_C$ are equal to each other, the separation of these signals is achieved in the following manner without using a filter.

Figure 4D:
Figure 4E:

Reference numeral 19 indicates a delay circuit, for example, an ultrasonic delay line, by means of which the signal $S_3=S_{CL}+S_{IL}$ (or $S_3'=S_{CL}-S_{IL}$) derived from the bandpass filter 18 is delayed by one horizontal scanning period 1H. The signals $S_3=S_{CL}+S_{IL}$ (or $S_3'=S_{CL}-S_{IL}$) in a certain horizontal scanning period $H_i$ and the signal $S_3'=S_{CL}-S_{IL}$ (or $S_3=S_{CL}+S_{IL}$) in the subsequent horizontal scanning period $H_{i+1}$, which are derived from the delay circuit 19 and the bandpass filter 18 are supplied to an adder circuit 20 to be added together, providing as an output a chrominance signal $2S_{CL}$ such as is depicted in FIG. 4D. In this case, the contents of chrominance signals in adjacent horizontal scanning periods are so similar that they can be regarded as substantially the same. Further, it is also possible to delay the signal from the bandpass filter 18 by three or five horizontal scanning periods due to their similarity.

Figure 4F:
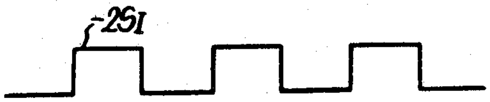

These signals $S_3=S_{CL}+S_{IL}$ (or $S_3'=S_{CL}-S_{IL}$) and $S_3'=S_{CL}-S_{IL}$ (or $S_3=S_{CL}\pm S_{IL}$) in the horizontal scanning periods $H_i$ and $H_{i+1}$ are also applied to a subtraction circuit 21 to achieve a subtraction $(S_{CL}-S_{IL})-(S_{CL}+S_{IL})$ [or $(S_{CL}+S_{IL})-(S_{CL}-S_{IL})$] to derive therefrom an index signal $-2S'_{IL}$ (FIG. 4E) or $2S'_{IL}$ (not shown). The resulting index signal $-2S'_{IL}$, or $2S'_{IL}$, is fed to a limiter circuit 22 to render its amplitude uniform, and thereby forming an index signal $-2S_I$ (or $2S_I$) as depicted in FIG. 4F.

The index signal $-2S_I$ (or $2S_I$) thus obtained is reversed in phase at every horizontal scanning period, so that the signal $-2S_I$ is corrected in phase through the use of a change-over switch 23 (an electronic switch in practice) having fixed contacts 23*a* and 23*b* and a movable contact 23*c*. The output side of the limiter 22 is directly connected to one fixed contact 23*a* of the changer-over switch 23 and ot the other fixed contact 23*b* through an inverter 24. the changer-over switch 23 is constructed so that its movable contact 23*c* makes contact with the fixed contacts 23*a* and 23*b* alternately for every horizontal scanning period in synchronism with the alternating signal $S_I$ impressed on the primary winding 12*a* of the transformer 12 to thereby derive the index signal $2S_I$ from the movable contact 23*c* at all times.

The chrominance signal $S_{CL}$ derived from the adder circuit 20 is supplied to synchronous detectors 25, 26 and 27. The index signal $S_{IL}$ is supplied to the synchronous detector 25 through a phase shifter 28 which adjusts the phase of the index signal to that of the red signal in order to produce a color difference signal R–Y at the output of the detector 25. In a similar manner the output signal from the phase shifter 28 is supplied to the synchronous detector 26 through a phase shifter 29 to produce a color difference signal G-Y at the output of the detector 26 and the output signal from the phase shifter 29 is supplied to the synchronous detector 27 through a phase shifter 30 to produce a color difference signal B–Y at the output of the detector 27. The phase shifters 29 and 30 each change the phase of the input thereto by 120°. These color difference signals and the luminance signal $S_Y$ are applied to a matrix circuit 31 to derive color signals $S_R$, $S_G$ and $S_B$ at its terminals $T_R$, $T_G$ and $T_B$, respectively. The color signals thus obtained may be suitably processed to produce color television signals for the NTSC system and other various systems.

It will be seen that, in the above described color television camera, the application of an alternating voltage to the electrodes A and B causes a predetermined pattern of potential changes to be formed on the surface of the photoconductive layer 1, which pattern or index image is reproduced as an index signal. In this manner the index signal does not narrow the dynamic range of the image pickup tube and the resolution of the color video signal is not lowered. Since the index signal, luminance signal and chrominance signal are not derived from individual electrodes, but are picked up in the form of one composite signal, even if crosstalk exists between the electrodes, color difference signals can be readily derived from a demodulator circuit, and accordingly a color video signal of good white balance can be obtained.

Since the index signal is obtained at the output of the pickup tube by supplying an alternating voltage to the electrodes A and B in synchronism with the line scanning period of the pickup tube, demodulation of the color video signal is easily accomplished. Further, when the color video signal is reproduced without the chrominance signal, the index signal may be simply obtained by adding to the output of the image pickup tube a signal produced by delaying the pickup tube output by one horizontal scanning period. In this manner there is no possibility of the index signal being mixed with the demodulated color video signal. Further, in the described color television camera, the index signal and the chrominance signal are in the same band, and hence the bands of the luminance signal and the chrominance signal can be widened to thereby provide a color video signal with high resolution. In addition, since the index signal and the chrominance signal are derived from a common preamplifier and filter, no difference in the delay time between these signals is produced and accordingly a picture of excellent white balance can be obtained. Further, the index signal does not interfere with the chrominance signal, and hence the picture quality is not degraded.

The formation of the color separated images on the photoconductive layer of the pickup tube may be accomplished by any conventional method. For example, as shown, the image of the object to be televised may be focused by an objective lens onto the photoconductive layer 1 through a color filter F disposed inside of the pickup tube in close proximity to the photoconductive layer 1. In this case, the optical system is of simple construction and need not be adjusted, so that an inexpensive color television camera can be produced. Alternatively, a lens screen (not shown) consisting of many lenticular lenses can be disposed on the outer surface of the face plate 4 of the pickup tube and the image of a color filter consisting of a plurality of pairs of striped color filter elements, and being interposed between an object to be televised and such lens screen, may be projected by the lens screen onto the photoconductive layer in overlapping relation to the image of the object being televised.

Referring now to FIGS. 6 and 7, it will be seen that, in one proposed construction of the image pickup tube 2 for use in the color television camera system of FIGS. 1 and 2, a transparent conductive layer, for example, of tin oxide, is deposited on the entire area of one surface of the thin glass plate 3 and is then subjected to photoetching to remove selected portions of that conductive layer so that the remaining portions of the latter form two interleaved, comb-shaped indexing electrodes A and B and a surrounding electrode C (FIG. 6). The surface of plate 3 facing away from electrodes A,B and C thereon is bonded, as by adhesive, to the glass face plate 4 which has the striped color filter F formed thereon. Holes 32 (FIG. 6) are bored through plates 3 and 4 at locations within the spines or bus-bar portions of electrodes A and B and each receive a conductive post 33 (FIG. 7), for example, of copper, which is sealed in the respective hole 32 by an indium bushing 34 which is also intended to establish electrical contact between the post 33 and the respective indexing electrode A or B. The photoconductive layer 1 is then applied over the entire surface of plate 3 having the electrodes A,B and C thereon.

The face plate assembly, constructed as above, is then secured on the front end of the tube envelope 5 by means of a conductive ring 35 and an intervening seal 36 of indium which extends onto the electrode C for electrically connecting the latter with conductive ring 35. Since the resistance of photoconductive layer 1 is very high, that layer 1 can extend onto electrode C, as shown, without disturbing the operation of the image pickup tube.

In employing the image pickup tube having the construction described above with reference to FIGS. 6 and 7 in the color television camera system of FIG. 1, the posts 33 associated with electrodes A and B are respectively connected to terminals $T_A$ and $T_B$ on FIG. 1. Further, if desired, electrode C may be grounded, or supplied with a bias potential equal to that applied to electrodes A and B, by way of the conductive ring 35 so as to prevent the storage of any unwanted charge on the faceplate assembly as a result of the impingement of the electron beam thereon. Of course, the mentioned unwanted charge also tends to be discharged from the electrode C to the electrodes A and B when the photoconductive layer 1 extends onto the electrode C, as shown.

The construction of the image pickup tube described with reference to FIGS. 6 and 7 gives rise to manufacturing problems, particularly as to the provision of the conductive posts 33 extending through the face plate for connecting the electrodes A and B to the circuits shown on FIG. 1. Such posts 33 complicate the structure and manufacture of the tube. Further, although the face plate assembly, as a unit, can be effectively sealed at the front end of the tube envelope 5 by means of the ring 35 and indium seal 36 through the use of existing techniques, difficulty is experienced in achieving the reliable hermetic sealing of the posts 33 in the face plate assembly.

In accordance with the present invention, the conductive posts 33 extending through the face plate are eliminated, and the indexing electrodes A and B have different voltages applied thereto through photoelectric transducers which are made part of the face plate assembly without interrupting the integrity of the latter, that is, without forming holes in the face plate assembly. For example, referring to FIGS. 8 and 9, it will be seen that, the image pickup tube 102 according to this invention has a face plate assembly which is similar to that of the previously described tube 2 and includes a glass face plate 104 with a striped color filter F thereon bonded to a thin glass plate 103 on which the indexing electrodes A and B and a surrounding electrode C are formed, as before. The illustrated face plate assembly is further shown to be mounted, in a sealed manner, at the front end of the tube envelope 105 by means of a conductive ring 135 and an indium seal 136 which electrically connects ring 135 with electrode C.

In accordance with this invention, the face plate assembly of tube 102 further includes photoelectric transducers 137A and 137B which extend between electrodes A and C and between electrodes B and C, respectively. As shown on FIG. 10 with respect to transducer 137A, each of the photoelectric transducers 137A and 137B may be a silicon photovoltaic cell consisting of a P-type region 138 and an N-type region 139 having metallic electrodes 140 and 141, respectively, formed thereon. The electrodes 140 and 141 are connected with electrode C and with electrode A or B, respectively, through solder layers 142 and 143 and metallic contact layers 144 and 145, respectively, provided on electrode C and on electrode A or B. As before the photoconductive layer 101 is applied over electrodes A,B and C and may cover the photoelectric transistors 137A and 137B, as shown.

Referring to FIG. 9, it will be seen that the photoelectric transducers 137A and 137B have selectively energizable radiant energy sources 146A and 146B respectively associated therewith at the front of face plate 104 to emit light rays which pass through face plate 104 and activate the respective transducers 137A and 137B at the back thereof. The radiant energy or light sources 146A and 146B are shown, with respect to source 146A, to each constitute a luminescent diode 147 and a lens 148 for focusing the emitted light on the respective transducer 137A or 137B. If the luminescent diodes 147 are in the form of GaAs (Gallium-Arsenic) diodes which emit infrared rays to which the photoconducive layer 101 is insensitive, no shielding is required to prevent exposure of layer 101 to the light from diodes 147.

Referring now to FIG. 11, it will be seen that, in the equivalent electrical circuit of the described image pickup tube 102 according to this invention, $R_o$ indicates a high resistance between the indexing electrodes A and B as a result of the photoconductive layer 101, and $R_a$ and $R_b$ are discharge resistors, for example, constituted by stripes of a resistive paint, bridging the electrodes A and C and the electrodes B and C (FIG. 8), and serving to discharge the charge due to the capacity formed between the electrodes A and B.

In employing the tube 102 according to this invention in the system of FIG. 1, the transformer 12 is omitted and the conductive ring 135 is connected to the junction point 149 between resistor R and capacitor 14. Further, the signal source 13 of FIG. 1 is replaced by a similar alternating signal source 113(FIG. 11) synchronized with the line scanning period of the electron beam and connected with the luminescent diodes 147 of light sources 146A and 146B through protection resistors $r_1$ which limit the current through diodes 147.

With the circuit shown on FIG. 11, the connection of conductive ring 135 to junction point 149 applies the bias voltage B+ to indexing electrodes A and B through electrode C which also functions as an output electrode. The alternating signal from source 113 alternately energizes the luminescent diodes 147 of light sources 146A and 146B, and the resulting light emitted from the latter passes through faceplate 104 and alternately activates the associated photoelectric transducers 137A and 137B. Thus, the voltages applied to electrodes A and B are alternately deviated from the bias voltage for every horizontal scanning perod, so that a striped potential pattern or index image corresponding to the interleaved comb-shaped electrodes A and B is formed on the surface of the photoconductive layer 101 and the composite output signal from the tube includes a corresponding index signal which is reversed in phase for successive scanning periods, as previously described with reference to FIGS. 1–4. The composite output signal is derived at conductive ring from electrode C and is applied to junction point 149 on FIG. 1 for feeding to preamplifier 15, wehreupon the circuit of FIG. 1 operates thereon in the manner previously described.

Figure 12:
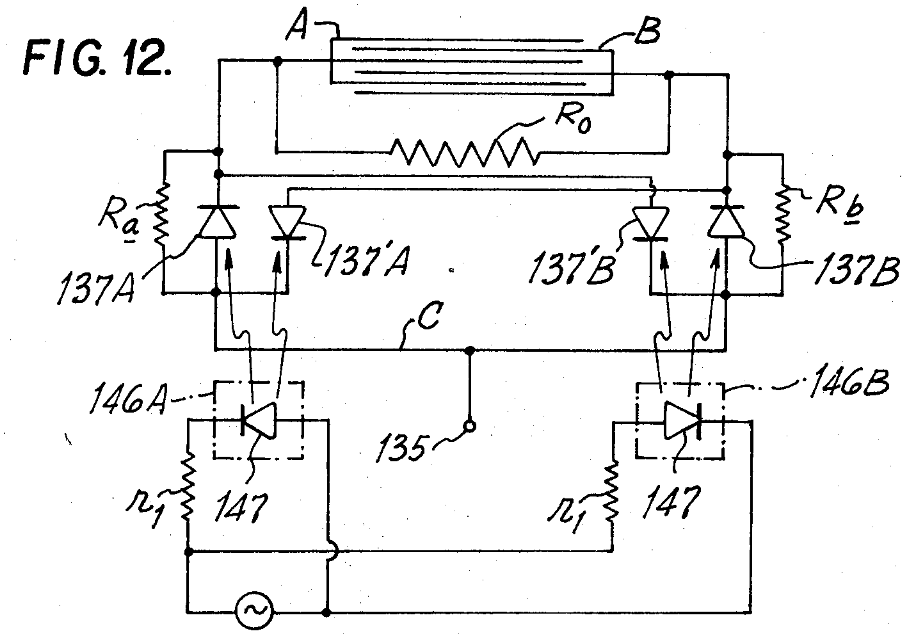

Referring now to FIG. 12, it will be seen that, in a modification of the embodiment of the invention described above with reference to FIG. 11, two photovoltaic cells 137A and 137'A are associated with the light source 146A and two photovoltaic cells 137B and 137'B are associated with the light source 146B. As shown, the photovoltaic cells 137A and 137'A are connected with electrodes A and B, respectively, so that, when the associated light source 146A is energized, the potential of electrode A will be increased and the potential of electrode B will be decreased with respect to the bias voltage applied to the indexing electrodes. Similarly, the photovoltaic cells 137B and 137'B are shown connected with electrodes B and A, respectively, so that, when the associated light source 146B is energized, the potential of electrode B will be increased and the potential of electrode A will be decreased with respect to the bias potential. Accordingly, the potential difference between electrodes A and B is increased to provide an index signal of increased magnitude.

Referring now to FIG. 13, it will be seen that, in another embodiment of the invention there illustrated schematically, the photovoltaic cells 137A and 137B of FIG. 11 are replaced by phototransistors 237A and 237B, respectively. In order to supply the necessary bias voltage to the phototransistors 237A and 237B, a plurality of photovoltaic cells 210 are included in the faceplate assembly of the image pickup tube and are continuously activated by light passing through the faceplate from a source 211 energized by a battery 212 or other D.C. voltage source. Two resistors $R_1$ in series are in parallel with the resistance $R_o$ of the photoconductive layer and the photovoltaic cells 210 are connected between electrode C and the junction 213 between resistors $R_1$. The phototransistors 237A and 237B are alternately activated by light from the respective sources 146A and 146B whereby to relatively reduce the voltage applied to the respective indexing electrodes A and B and thus produce the potential differences between the indexing electrodes for producing the index signal as previously described.

Referring now to FIG. 14, it will be seen that, in another embodiment of the invention there illustrated schematically and which is generally similar to that of FIG. 13, the phototransistor 237A and 237B of the latter are replaced by photoconductive cells 337A and 337B, respectively, formed, for example, of CdS. Here again photovoltaic cells 210 are provided as parts of the face plate assembly and are continuously actuated by an external light source 211 energized by a D.C. source 212. The photoconductive cells 337A and 337B are alternately activated by the respective light sources 146A and 146B. When activated, each of photoconductive cells 337A and 337B applies to the respective indexing electrode A or B a voltage that is increased, by the voltage supplied by photovoltaic cells 210, above the normal bias voltage supplied from ring 135 by way of electrode C and resistors $R_2$. Thus, voltage differences are established between indexing electrodes A and B to provide the index signal which is reversed in phase for successive scanning periods.

Referring now to FIG. 15, it will be seen that, in still another embodiment of this invention there illustrated schematically, a single photoelectric transducer 437, for example, a photodiode, is provided as part of the faceplate assembly and is intermittently energized by light passing through the faceplate from an associated source 146 connected with the alternating signal source 113. The photodiode 437 is connected with a capacitor 410 and with a discharge resistor $R_3$, as shown, so that, when the photodiode 437 is energized, the resulting produced voltage increases the voltage applied to electrode A relative to the voltage impressed on electrode B and charges capacitor 410, and, when photodiode 437 is deenergized, the charge on capacitor 410 increases the voltage impressed on electrode B as compared with that on electrode A. Thus, in response to the energization of light source 146 only during alternate scanning periods, the composite output signal derived at ring 135 includes an index signal which reverses its phase in successive scanning periods.

In the color television camera system shown on FIGS. 1 and 2 and in the previously described image pickup tubes according to this invention intended for use in that system, the electrodes A and B function to electrically produce the index image and also to derive the composite output signal which incudes the index signal superimposed on the color video signal. However, in another color television camera system, for which image pickup tubes according to this invention may be provided, a separate signal electrode may be included in the image pickup tube for deriving the composite output signal. For example, as shown on FIGS. 16, 17 and 18, in that case, the indexing electrodes A and B may be formed on the back surface of a transparent insulating layer 503, for example, of glass, which has its front surface bonded to the glass face plate 504 having the striped color filter F formed on its back surface, and a thin transparent insulating layer 505, for example, of glass, is interposed between indexing electrodes A and B and a transparent signal electrode 506. The signal electrode 506 may be formed of nesa, as in the case of the signal electrode of a conventional image pickup tube, but has a mesh or network structure, as clearly shown on FIG. 17. A photoconductive layer 501 extends over the entire signal electrode 506 and forms the surface of the faceplate assembly facing toward the electron gun 511 which emits the electron beam that is made to scan layer 501.

In previously proposed image pickup tubes with a separate signal electrode 506, the latter is connected to a terminal 510 which is, in turn, connected to a power source B+ through a resistor 512 and to a preamplifier 515 through a capacitor 514. Further, the indexing electrodes A and B are respectively connected to terminals $T_A$ and $T_B$ which receive an alternating signal from a source 513. The remainder of the system is similar to that shown on FIG. 1. Thus, the color television camera sytstem of FIGS. 16–18 is intended to operate as follows:

The alternating signal from source 513 is synchronized with the horizontal scanning period of the electron beam and supplied to terminals $T_A$ and $T_B$, through which the signal is applied to the electrodes A and B. The different potentials applied to the electrodes A and B are transmitted to the photoconductive layer 501 through the thin insulating layer 505 and the signal electrode 506. As a result of this, when no light is directed to the photoconductive layer 501, there is formed on the photoconductive layer 501 a dot-like potential pattern as depicted in FIG. 19A in which the potential is high at those areas corresponding to the electrode A and low at those areas corresponding to the electrode B in a certain horizontal scanning period and a dot-like potential pattern as shown in FIG. 19 which is opposite in sense to the one described above in the subsequent horizontal scanning period. Accordingly, when no light is incident on the photoconductive layer, rectangular wave signals $S_I$ and $-S_I$ such as are shown in FIGS. 4A and 4A' are respectively derived from the signal electrode 506 contiguous to the photoconductive layer 501 in two consecutive horizontal scanning periods, as in the example of FIG. 1, and these rectangular wave index signals are derived from the output terminal 510 through the capacitor 514. It will be understood that, when a color separated image of an object 10 is projected on layer 501 by the combined action of lens 9 and color filter F, the index signals are superimposed on color video signals to provide a composite signal at output terminal 510. Further, through the use of the circuits described with reference to FIG. 1, the individual color component signals can be separated from the composite output signal.

However, in image pickup tubes proposed for use in the system of FIGS. 16–18, the connection of indexing electrodes A and B to terminals $T_{A\ and\ TB}$ for reception of the alternating signal from source 513 has been effected in the manner described above with reference to FIGS. 6 and 7 with the resultant difficulties that have been mentioned. In order to avoid such difficulties an image pickup tube for the system shown on FIG. 16 may, in accordance with this ivnention, be provided with a construction similar to that previously described with reference to FIGS. 8 to 11, but with the addition thereto of the signal electrode 506 and the thin glass layer 505 which is interposed between that signal electrode and the indexing electrodes A and B.

Thus, as shown schematically on FIG. 20, an image pickup tube according to this invention for use in the sytem of FIG. 16 includes photovoltaic cells 137A and 137B as parts of the faceplate assembly which extend between the electrode C and the electrodes A and B, respectively, and which are alternately energized by respective light sources 146A and 146B, in the form of luminescent diodes 147, energized from the alternating signal source 513. The additional signal electrode 506 is also connected with the electrode C surrounding the index electrodes A and B, and the conductive ring 135 is connected with the terminal 510 on FIG. 16. Therefore, the bias voltage from source B+ is applied to signal electrode 506 and the composite output signal derived from signal electrode 506 is applied from terminal 510 through the capacitor 514 to preamplifier 515. Such composite signal includes the color video signal and, superposed thereon, the index signal which results from the voltage differences established between electrodes A and B in response to the alternate energization of the photovoltaic cells 137A and 137B, as previously described.

It will further be seen that, in the embodiment of FIG. 20, an additional resistor $R_o$ is connected between electrodes A and B to form a closed circuit, and such resistor $R_o$ preferably has a center top $T_o$ connected to terminal 510 in order to obrain stable bias voltages.

It will be apparent that, in the embodiment of FIG. 20, as well as in all of the other embodiments of this invention described above, the voltage differences are established between the indexing electrodes A and B to produce the index signal in the composite output without the provision of terminal pins extending through the faceplate assembly, as at 33 on FIG. 7. Thus, the image pickup tubes according to this invention can be reliably hermetically sealed and the manufacture thereof is simplified.

Although various embodiments of the invention have been described in detail herein, it is to be understood that the invention is not limited to those precise embodiments, and that various changes and modifications may be effected therein by one skilled in the art without departing from the scope or spirit of the invention.

What is claimed is:

1. A color television camera comprising a surface scanned by an electron beam for converting light projected on said surface into an electrical output, filter means disposed between an object in the field of view of the camera and said surface for forming on said surface a color separated image of said object made up of image elements corresponding to the color components of respective elements of said object, a pair of index electrodes for each of said image elements and which are disposed in close proximity to said surface, and circuit means including photoelectric transducing means for applying different electrical potentials to said index electrodes of each said pair thereof for electrically forming an index image on said surface and reversing said different electrical potentials in successive periods of said electrical output so that said electrical output is a composite signal containing a color video signal corresponding to said color separated image and an index signal corresponding to said index image and having its phase reversed in said successive periods.

2. An image pickup tube according to claim 1, in which said surface, indexing electrodes and photoelectric transducing means are joined together in a unitary structure constituting a faceplate assembly of the image pickup tube.

3. An image pickup tube according to claim 2, further comprising a tube envelope having said faceplate assembly disposed at one end, a conductive ring extending around said end of the tube envelope and around the periphery of said faceplate assembly, an electrically conductive sealing member interposed between said ring and said faceplate assembly and tube envelope for hermetically sealing said end of the tube, and conductive means on said faceplate assembly between said sealing member and said index electrodes for applying a bias voltage to the latter from said conductive ring.

4. An image pickup tube according to claim 3, in which said indexing electrodes are in contact with said surface which has a high resistance so that said electrical output is obtained at said conductive ring from said indexing electrodes.

5. An image pickup tube according to claim 3, further comprising signal electrode means in contact with said surface and electrically connected with said conductive ring for receiving a bias voltage from the latter, and a tansparent insulating layer between said indexing electrodes and said signal electrode so that said electrical output is obtained at said conductive ring from said signal electrode.

6. An image pickup tube according to claim 5, in which said signal electrode is in the form of a mesh.

7. An image pickup tube according to claim 1, in which said circuit means for applying different voltages to the indexing electrodes includes light source means at the exterior of said image pickup tube for emitting light rays to activate said photoelectric transducing means.

8. An image pickup tube according to claim 7, wherein said indexing electrodes each include a plurality of elongated parallel elements extending at right angles to the direction of scanning of said surface by said beam with said elements of one of said indexing electrodes being interleaved with said elements of the other of said indexing electrodes so that said index signal is represented by an alternating voltage in said output, and said circuit means further includes an alternating signal source synchronized with the scanning of said beam and connected with said light source means to cause said photoelectric transducing means to alternate said different voltages applied to said indexing electrodes in successive scanning periods and thereby reverse the phase of said index signal in said successive scanning periods.

9. An image pickup tube according to claim 7, in which said light source means includes at least one luminescent diode which, when energized, emits said light rays.

10. An image pickup tube according to claim 7, in which said photoelectric transducing means includes at least one photovoltaic cell which, when energized by light rays from said light source means, increases the voltage applied to one of said indexing electrodes with respect to the voltage applied to the other of said indexing electrodes.

11. An image pickup tube according to claim 7, in which said photoelectric transducing means includes at least first and second photovoltaic cells connected with said indexing electrodes to alternately increase the voltages applied to said indexing electrodes in response to the activation of said first and second cells, and said light source means includes first and second light sources which are alternately energized to emit light rays for alternately activating said first and second photovoltaic cells.

12. An image pickup tube according to claim 11, in which said photoelectric transducing means includes third and fourth photovoltaic cells activated by light rays from said first and second light sources, respectively, and connected with said indexing electrodes for decreasing the voltages applied to each of said indexing electrodes simultaneously with the increasing of the voltage applied to the other of said indexing voltages by activation of a selected one of said first and second photovoltaic cells.

13. An image pickup tube according to claim 7, in which said circuit means further includes means for applying a bias voltage to said indexing electrodes, asid photoelectric transducing means includes first and second phototransistors connected with said indexing electrodes to alternately decrease said bias voltage applied thereto in response to the activation of said first and second phototransistors, and said light source means includes first and second light sources which are alternately energized to emit light rays for alternately activating said first and second phototransistors.

14. An image pickup tube according to claim 13, in which said means for applying a bias voltage includes at least one photovoltaic cell included in said faceplate assembly, said photovoltaic cell being continuously energized by light from an external light source.

15. An image pickup tube according to claim 7, in which said circuit means further includes means for applying a bias voltage to said indexing electrodes, sid photoelectric transducing means includes first and second photoconductive cells through which said bias voltage is applied to the respective indexing electrodes in response to selective activation of said first and second photoconductive cells, and said light source means includes first and second light sources which are alternately energized to emit light rays for alternately activating said first and second photoconductive cells.

16. An image pickup tube according to claim 15, in which said means for applying a bias voltage includes at least one photovoltaic cell included in said faceplate assembly said photovoltaic cell being continuously energized by light from an external source.

17. An image pickup tube according to claim 7, in which said circuit means includes capacitor means connected with said indexing electrodes and said photoelectric transducing means, and is operative to charge said capacitor means and raise the potential of one of said indexing electrodes relative to the other indexing electrode upon activation of said photoelectric transducing means, with the charge on said capacitor means being effective to raise the potential on said other electrode relative to said one electrode upon deactivation of said photoelectric transducing means, and in which said light source means is intermittently energized.

18. An image pickup tube according to claim 17, in whcih said photoelectric transducing means is a single photodiode.

19. An image pickup tube according to claim 1, in which said photoelectric transducing means are responsive to light rays which surface is insensitive.

* * * * *